United States Patent
Chatow et al.

(10) Patent No.: US 9,123,012 B2
(45) Date of Patent: Sep. 1, 2015

(54) METHOD AND SYSTEM FOR DEFINING PACKAGING COMPONENTS USING LIFECYCLE ANALYSIS

(75) Inventors: Ehud Chatow, Palo Alto, CA (US); Benjamin I. Dempster, San Francisco, CA (US); Alysha Naples, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

(21) Appl. No.: 13/700,843

(22) PCT Filed: Jun. 11, 2010

(86) PCT No.: PCT/US2010/038398
§ 371 (c)(1),
(2), (4) Date: Nov. 29, 2012

(87) PCT Pub. No.: WO2011/155949
PCT Pub. Date: Dec. 15, 2011

(65) Prior Publication Data
US 2013/0080458 A1    Mar. 28, 2013

(51) Int. Cl.
*G06Q 10/08* (2012.01)
(52) U.S. Cl.
CPC ...................... *G06Q 10/08* (2013.01)
(58) Field of Classification Search
None
See application file for complete search history.

(56) References Cited

U.S. PATENT DOCUMENTS

| | | | |
|---|---|---|---|
| 7,517,622 B2 | 4/2009 | Golodetz et al. | |
| 7,979,457 B1 * | 7/2011 | Garman | 707/768 |
| 8,538,822 B1 * | 9/2013 | Meiresonne | 705/26.1 |
| 2002/0095355 A1 * | 7/2002 | Walker et al. | 705/26 |
| 2002/0095518 A1 | 7/2002 | Bozich et al. | |
| 2003/0046681 A1 | 3/2003 | Barturen et al. | |
| 2003/0200111 A1 * | 10/2003 | Damji | 705/1 |
| 2004/0078275 A1 * | 4/2004 | Ismert et al. | 705/26 |
| 2005/0049938 A1 * | 3/2005 | Venkiteswaran | 705/27 |
| 2005/0114193 A1 * | 5/2005 | Kroening | 705/8 |
| 2005/0174236 A1 | 8/2005 | Brookner | |
| 2008/0154749 A1 | 6/2008 | D-Hooghe et al. | |
| 2009/0265179 A1 | 10/2009 | Cunniff et al. | |
| 2010/0030354 A1 | 2/2010 | Wiesel | |

FOREIGN PATENT DOCUMENTS

KR    20060112354 A    11/2006

OTHER PUBLICATIONS

Acevedo, Laura, "Product Life Cycle Extension Strategy".
HP ECO Solutions, "Product Design for the Environment" Research Paper, 1992.
Sybille, Busser et al, "The Role of Flexible Packaging in the Life Cycle of Coffee and Butter", Research Paper, Published Jan. 20, 2009.

* cited by examiner

*Primary Examiner* — Alex Gofman
*Assistant Examiner* — Umar Mian
(74) *Attorney, Agent, or Firm* — International IP Law Group

(57) ABSTRACT

Methods and systems for defining packaging components are provided. An exemplary embodiment provides an expert system (508) for defining packaging components. The expert system includes a processor (512) and a memory (514). The memory (514) includes code (510) configured to direct the processor (512) to obtain a product definition, obtain lifecycle parameters, and access a database (518, 522, or 524) to identify packaging components that match the lifecycle parameters and product definition.

9 Claims, 6 Drawing Sheets

200

METHOD AND SYSTEM FOR DEFINING PACKAGING COMPONENTS USING LIFECYCLE ANALYSIS

BACKGROUND

Each stage of a product's lifecycle from packaging printing and bottling, through end-user consumption and disposal, place a requirement on packaging solution components. The knowledge required to develop packaging for new products, or new versions of existing products, across these stages is fragmented and often not well codified. Further, the knowledge may be highly specialized, requiring expertise that may often be well beyond a casual developer.

BRIEF DESCRIPTION OF THE DRAWINGS

Certain exemplary embodiments are described in the following detailed description and in reference to the drawings, in which.

DETAILED DESCRIPTION

Figure 1:
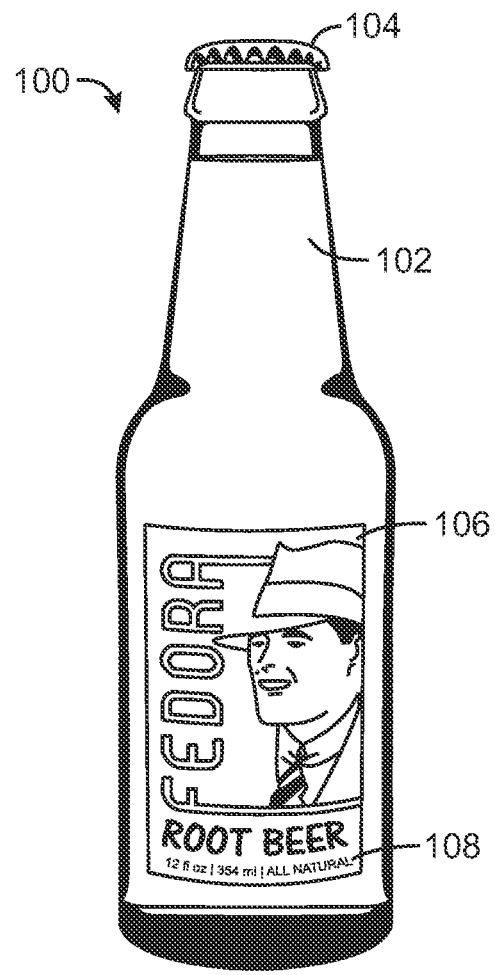
FIG. 1 is a drawing of a product package that demonstrates some of the complexity of packaging choices.

An exemplary embodiment of the present invention provides an expert system for selecting appropriate packaging for products, starting from the definition of the product type, and proceeding through product lifecycle parameters, related component recommendations and suppliers. The expert system may be directly accessed over a network, such as a local area network or LAN, a wide area network or WAN, or the Internet. In exemplary embodiments, the expert system may be accessed from a supplier site without a developer knowing that the supplier is using a third party to provide expertise. The expert system may ease the development of packaging for new products. The expert system may use a logic tree starting from product type definition, and running through product lifecycle parameters, providing recommendations for related components and suppliers.

Gathering the information required to develop appropriate and effective packaging solutions can be time consuming and difficult, especially for inexperienced persons and organizations. As an example, if a company did not to take into account the abrasion of the printed label during a particular bottling process, the label could fail, resulting in rejection by a retailer. As another example, an inappropriate selection of adhesive material or label substrate for a label on a bottle that will be stored in a refrigerated environment, may lead to the label falling off during shipping or after purchase. This may result in a negative experience for the retailer or end user. Further, if an entrepreneur does not account for the compatibility of the material used to form a bottle for a new product, the bottle may fail, perhaps leading to a complete loss of the product and bottles.

Currently, developing a packaging solution for a product can be performed by researching solutions for products that are similar. However, reverse engineering of a solution, prototyping and testing can be time consuming. Further, the process may use substantial expertise not available to smaller companies or individuals. There may also be subtle differences in requirements that will not translate from an existing packaging solution to the specific product, such as materials compatibility with a product type.

General research can be performed using the resources available on the World Wide Web. However, the information may be incomplete, for example, not fitting the specific use case or lifecycle requirements. Options may be reviewed by discussing the application with various stakeholders, such as materials suppliers, container suppliers, printers, bottlers, paper companies, retail buyers, end-users, recyclers, and the like. However, in addition to taking a significant amount of time, each of the stakeholders may only present a limited number of options. A developer may hire external consultants such as industrial designers and engineers to help define components and design solutions. However, this can be prohibitively expensive. Further, the expertise of the individuals may often be narrowly focused, so there may be challenges and risks in coordination and knowledge sharing between the experts. In addition, creating unique combinations of materials, design, and size may be very costly or not meet the production timeline as these combinations may not be available in stock, and may therefore need to be sourced from different suppliers.

In contrast to these solutions, embodiments of the present invention will enable people who are unskilled in the art to define appropriate and sophisticated packaging solutions using the expert system. The method proposed may reduce packaging development timeframes and cost. It may also reduce the risk of re-manufacturing of packaging to repair defects, such as labels lost in transit.

FIG. 1 is a drawing of a product package that demonstrates some of the complexity of packaging choices. In this example, the product package is a bottle 100 that is used to hold a carbonated beverage 102. To prevent escape of the carbonation, the bottle 100 can be selected from relatively impermeable materials, such as glass, or an impermeable plastic. Alternatively, if the bottle 100 is intended to have a short shelf life, permeability may be less of an issue, as the product may be consumed before significant carbonation is lost. The selection of the material may have a substantial effect on the shipping costs. For example, glass bottles will be heavier and, thus, more expensive to ship than lighter plastic bottles. However, glass bottles may be more resistant to pressure than plastic bottles. The bottle 100 should be strong enough hold the pressure of the carbonated beverage, even under high temperature storage, such as greater than 100° F., which may be found in a warehouse, a storeroom, a truck, and the like. Similarly, the bottle cap 104 should hold the internal pressure at high temperatures, even with rough handling. The bottle cap 104 may be a metal crown cap, as shown in this example, or may be a screw-on plastic cap. Other types of caps, such as snap-on caps, may not be able to hold the pressure.

The bottle 100 may have a label 106, or multiple labels, to identify contents and ingredients. The label 106 may be attached to the bottle 100 using an adhesive, such as a water-activated adhesive or a polymeric adhesive. Other type of labels 106 may also be used, such as heat shrink labels and the like. The material of the label 106 and the technology used to attach the label 106 to the bottle may be influenced by expected handling conditions. For example, water activated adhesives may fail if the bottle 100 is refrigerated and then moved to a warmer area where condensation can form.

Further, the text 108 of the label 106 may be subject to various governmental regulations. For many products, these regulations may not only dictate the listing of ingredients, such as nutritional content boxes, but may also dictate font sizes and allowable names, as in the case of pharmaceuticals. Accordingly, an inexperienced product developer is faced with a substantial number of choices. Further, even if all of these choices are made correctly, products may be incompatible with the package, as discussed with respect to FIG. 2.

Figure 2:
FIG. 2 is a drawing of another product package.

FIG. 2 is a drawing of another product package, in accordance with exemplary embodiments. In this example, a plastic bottle 200 has been selected to hold a liquid soap product 202. The plastic bottle 200 has a screw cap 204 and a label 206. The label 206 may be a heat shrink label that wraps around the plastic bottle 200, as shown. Although many products are distributed in plastic bottles 200, not all plastics are suitable for some products, such as soaps. The organic emulsion that forms the soap solution may attack some plastics, which may lead to failures of the plastic bottle 200. This can result in product loss under storage conditions. In addition to the considerations discussed with respect to FIGS. 1 and 2, the ultimate disposal of the product may not be considered when selecting product packaging. In an exemplary embodiment of the present invention, the lifecycles stages are used by the expert system to aid a developer in developing a packaging solution.

The product lifecycle stages that may be considered when developing a packaging solution will vary according to product vertical, e.g., product type and classification, and supply chain structure. For example, a broad set of lifecycle stages for a beverage to be produced by small company that outsources production and distributes through retail outlets could include product ingredients, prototyping, printing, bottling, labeling, shipping, storing, retailing, consuming, and disposing. Each of these lifecycle stages could present numerous options, many of which may not be compatible with choices made at later stages. Accordingly, an exemplary embodiment of the expert system includes an iterative component to inform a purchaser of an incompatibility between the product ingredients and the container material, and to propose alternate choices that may accommodate the developer. This is discussed further with respect to FIG. 3.

Figure 3:
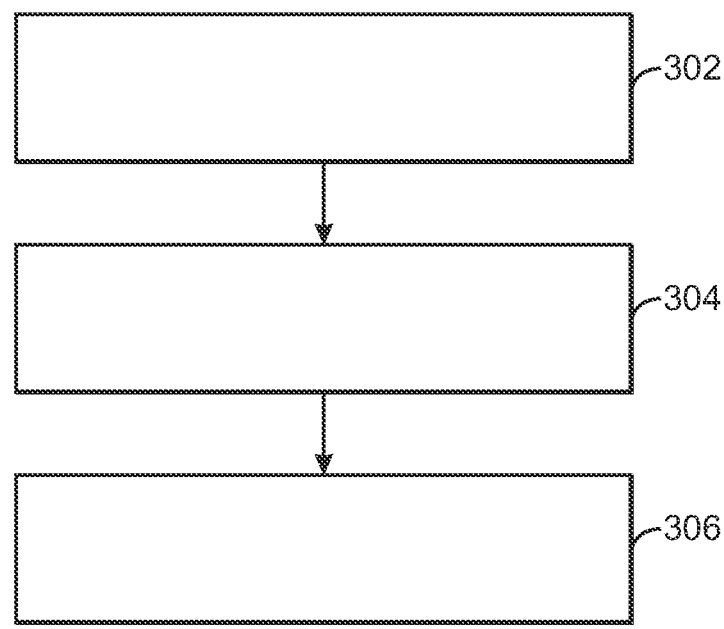
FIG. 3 is a process flow diagram of a method for selecting a product package, in accordance with an exemplary embodiment of the present invention.

FIG. 3 is a process flow diagram of a method 300 for selecting a product package, in accordance with an exemplary embodiment of the present invention. The method 300 begins at block 302 with the definition of a basic product type. For example, an entry form may request entry of the product type, such as beverage, personal care, etc., and size, such as 5 oz., 10 oz., 20 oz, or more. The entry form may also request product ingredients, such as carbonated water, soap, emulsion, and the like, and treatment conditions, such as pasteurization, shipping conditions, storage conditions, and the like. From an initial set of entries, an initial set of product verticals, for example, bottles and jars, may be recommended to the developer. As an example, a developer may enter soda+12 oz bottle+glass+clear+location of target market, or shampoo+20 oz+plastic+blue+location of target market. The expert system may then provide a selection of compatible packaging for the developer's selection. The expert system may also indicate relevant packaging regulations for the material in the location of the target market At block 304, after an initial selection of packaging is made, the relevant lifecycle stages may be defined and relevant parameters may be selected for each lifecycle stage. This may be understood more clearly with respect to the lifecycle stages shown in Table 1.

TABLE 1

Lifecycle parameters and Component Recommendations

| Example Lifecycle Stages | Example Lifecycle Parameters for Entry | Example Component Recommendations made by Expert system |
|---|---|---|
| Conception | Product Material<br>Product Vertical<br>Target Outlet | Available bottle materials<br>Federal Regulations for packaging<br>Suppliers/choices for Product Vertical |
| Printing | Color Selections<br>Label Data<br>Label Graphics | Federal labeling requirements<br>Relative Font size (s)<br>Relative Label size (s) |
| Bottling | Bottling process<br>Sterilization process<br>Boxing process | Bottle Material<br>Shape of bottle<br>Type of label |
| Labeling | Label types<br>Machinery type<br>Printing type | Pretreatment of containers<br>Type of label varnish<br>Imposition standard |
| Shipping | Cost ranges<br>Type of Shipping<br>Product vulnerabilities | Handling requirements<br>Weight of container<br>Tracking Standard |
| Storing | Storage Parameters<br>Duration in Warehouse<br>Desired storage life | Storage parameters<br>Type of shipping box<br>Bottle diameter |
| Retailing | Type of retail environment<br>Ordering environment<br>Location | Labeling requirements<br>Style of container<br>Type UPC code |
| Consuming | Desired consumer shelf life<br>Storage Environment<br>Expiration dates | Type of label glue<br>Type of label substrate |
| Disposing | Return/Reuse<br>Recyclability<br>Product Residual Requirements | Bottle Material<br>Type of label ink<br>Type of label |

In Table 1, the initial entries made with respect to block 302 are shown in the conception block. After conception, other lifecycle stages may be defined for a particular type of product, as shown in FIG. 2. The particular stages are not limited to the stages shown in FIG. 2, as other stages may be identified for different products. Further, not all of the lifecycle stages shown may be required for every application. For example, a water bottle used for a special event may not have a label. Instead, the water bottle may be sold in a labeled carton. Any stages that are irrelevant may be identified during the data entry, and dropped from or collapsed in the entry form.

For each stage, a developer may enter relevant information for the package and product and be given recommendations for product packages and labeling. Information entry into the stages is not limited to a sequential order, for example, as shown in Table 1, but may be entered in any order. Further, the stages may be interdependent. Thus, information entered into a particular lifecycle stage may affect recommendations provided in an earlier stage. For example, if a developer enters that a product may be subject to high humidity conditions when storing the product, a previous recommendation for a label adhesive may be withdrawn.

For printing of a bottle or label, a developer may define the colors, the label data, and the label graphics that are desired. Based in part on these parameters, the expert system may suggest the label information that is required by packaging regulations at the point of use, in addition to label sizes and font sizes relative to the size of the container or label.

The machinery available at likely processing facilities, such as bottling or packaging plants near the developer, may also influence the recommendations. For example, a bottling process selected by the developer may also include other machine related items, such as the sterilization processes and boxing equipment available at a particular bottling plant. These entries may affect the material choices for the bottle, because certain materials may be damaged by certain sterilization processes. For example, many plastics cannot be used for bottles subjected to steam or heat sterilization processes. Similarly, glass bottles may be impractical in aseptic packaging applications, because high temperature sterilization is not required. The bottling process may also limit the package shapes that may be recommended, as the equipment available may be designed to process certain package shapes. Although the labels may often be applied after sterilization is completed, the boxing process will influence the label requirements. For example, a boxing process with a significant amount of abrasion may lead to a recommendation for a tougher varnish to reduce damage to the label during processing.

The labeling process that may be used in a processing facility may also control the type of labels that may be used, as certain plants may only have certain types of label application equipment. Accordingly, the printing type may be selected, but may also be influenced by the types of labels that can be used. The labeling equipment may also control the imposition standard, i.e., the layout and orientation of the labels on a master roll. Depending on the bottle material and the label selected, pretreatment of the bottles may be recommended to enhance adhesion. Such pretreatment may include flame treating, corona treating, solvent treating, and the like.

A number of shipping parameters may be entered by the developer. Such entries may include the desired cost of shipping, the type of shipping, and any product vulnerabilities, such as maximum or minimum temperatures to be avoided during shipping. The expert system may then recommend handling requirements, container weights, and tracking standards to be used in tracking shipments. The entries made for this lifecycle stage may influence previous recommendations and choices. For example, if the actual cost of shipping is higher than the desired cost, the expert system may recommend changes to the materials, such as exchanging plastic for glass, if possible.

The lifecycle parameters for storing a product may include such factors as range of storage temperatures, expected duration in a warehouse, and desired storage life. The expert system may then use these parameters to recommend storage temperatures and types of shipping materials, such as boxes. The developer may have a contract with a storage location for a certain amount of floor space, which may be entered into the expert system. This parameter may be used by the expert system to recommend different bottle sizes, or even the size of process runs.

Retailing parameters that might be entered by a developer may include the type of retailing environment, such as a grocery store, event sales, vending machine, or on-line sales, among others. The retailing environment may be used by the expert system to determine labeling requirements, such as the presence or type of UPC code. The sales location and type of ordering environment, such as over the internet, phone orders, or automatic restocking of a given shelf space by a distributor, among others, may change previous recommendations made by the expert system, such as tracking standards, shipping boxes, and the like. Another factor may be the type of ink used on the product. If the package or label is in direct sunlight and there is a requirement for light fastness for a certain period, for example, one week, then the product can be produced using a lightfast ink set.

The consumer's experience with the product may determine the overall success or failure of the product. Accordingly, a number of lifecycle parameters may be entered into the expert system that relate to consuming the product. For example, the developer may enter the desired shelf life for the product after it has been purchased by the consumer. As part of the shelf life is used in shipping and storage, a product may expire before a consumer has had a chance to consume it, which may lower the consumer's impression of the product. The storage environment for the product must also be taken into account. A consumer may purchase the product and carry it home in a hot car. Thus, the label adhesive may be exposed to a high humidity condition, leading to a failure. Accordingly, the expert system may recommend that a refrigerated consumer product use a shrink-sleeve label, direct printing of the label onto the container, or a non-water activated adhesive for the label.

The final lifecycle stage that may be considered is the disposal of the product. Many locations have implemented mandatory return provisions, which charge consumers fees for purchasing certain products, such as beverages. The fees may be refunded when the empty package is returned after purchase. However, the package components may control the recyclability or reuse of the package and a non-recyclable package may add substantial disposal costs to the product. Accordingly, the expert system may recommend package materials, label materials, label inks, and the like, that may be placed in a recycle stream without causing problems. Further, the developer may wish to improve the standing of the product by increasing the recyclability of the package. Thus, the parameters for disposing may include any mandatory return provisions, recyclability, and the like. Additional requirements may be imposed for disposing of packages that may have toxic residues, such as insecticides. The disposal requirements and associated labeling requirements may be identified by the expert system, and added to the label requirements discussed previously.

The various lifecycle parameters and recommendations are not limited to those discussed above and shown in Table 1. Any number of other parameters may be used to assist in defining packaging for products.

Once the lifecycles parameters are entered, at block 306, the expert system may display the packaging that meets the requirements selected. The developer may be shown any contradictions, and allowed to make modifications based on the most important features. In embodiments, commercially available packaging solutions that meet the requirements may be shown to the developer.

In an exemplary embodiment, the entries for each of the lifecycle stages are used to limit currently available products from a vendor to match the developer's selections. A visual menu of commercially available product choices may be presented to the developer, for example, on a particular vendor's website, as discussed further with respect to FIG. 4.

Figure 4:
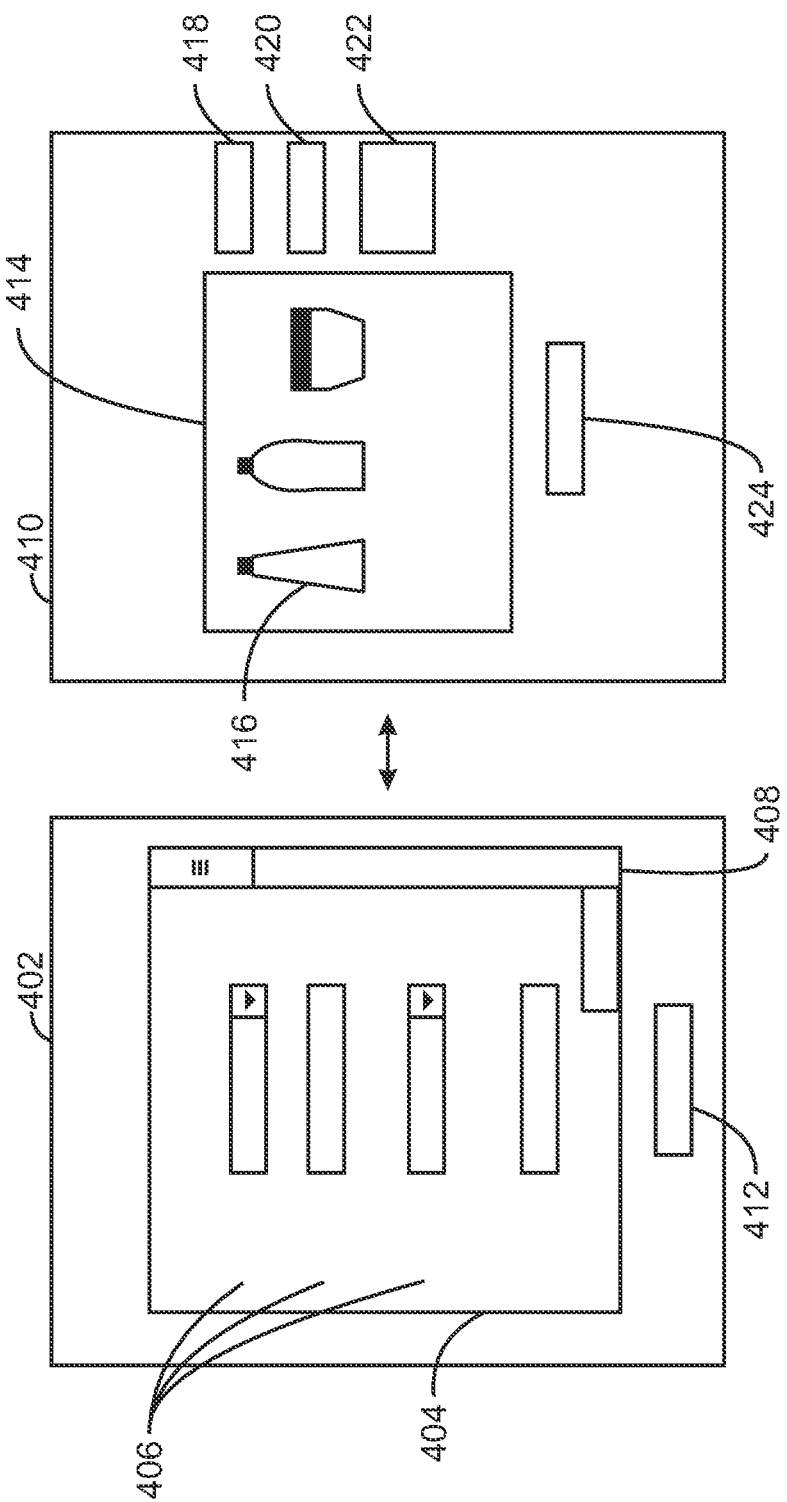
FIG. 4 shows two screen shots from an expert system that can be displayed on a supplier's web site, in accordance with an exemplary embodiment of the present techniques.

FIG. 4 shows two screen shots from an expert system that can be displayed on a supplier's web site, in accordance with an exemplary embodiment of the present techniques. In embodiments, the expert system may be located on an external server, and accessed by the vendor. In other embodiments, the expert system may be located on the vendor's servers.

A parameter screen 402 may be accessed by a developer that wishes to determine if a product vendor has an appropriate container for the product. The parameter screen 402 may display a window 404 provided by the expert system that allows the developer to enter the appropriate product definition and lifecycle parameters 406 for the product and package, as discussed with respect to FIG. 3. The window 404 may be a frame window, for example, generated using an HTML iframe tag, which provides an interface to an expert system located on a remote server. The window 406 may be provided as a single window, for example, with a scroll bar 408 to access further content. In other embodiments, a series of windows 406 may be provided, for example, with each window 406 targeting a single lifecycle stage. The developer may switch between the parameter screen 402 and a selection screen 410, for example, by clicking on a selections button 412.

The selection screen 410 may display a selection window 414 that shows the packaging 416 available from the vendor that matches the parameters entered by the developer. The developer may click on a packaging component 416 to add it to a cart. Although the packaging components 416 are shown as bottles in this example, the packaging components 416 may include bottles, labels, bags, jars, or any number of other packaging materials. The selection screen 410 may provide various other option buttons, for example, to display a cart 418 holding selections for purchase, a button 420 to purchase the package, or a button 422 to contact the vendor. If no products from the vendor meet the parameters entries made by the developer on the parameter screen 402, the expert system may display contact information for the vendor on the selection window 414. The developer may switch back to the parameter screen 402, for example, by clicking on a parameters button 424.

The arrangement of screens 402 and 410 and windows 404 and 416 is not limited to that shown in FIG. 4. The arrangements and accesses shown in FIG. 4 are merely an example of how the expert system could be integrated into a vendor's Web site. Any number of other arrangements and screens may be used to allow a developer to access the expert system from a vendor Web site. In all of these arrangements, the access to the expert system may be transparent to the developer, who may not be aware that they are accessing a remote expert system through the vendor Web site.

Further, the present invention is not limited to displaying a window on a vendor's Web site. In an exemplary embodiment, the expert system is accessed through a more general Web site or interface. For example, such an interface may be located on a server owned by the provider of the expert system. In this exemplary embodiment, the expert system is not associated with any single vendor, but can make recommendations for numerous vendors of packaging materials, such as bottles, labels, and the like, from a catalog holding information for a number of vendors. If no products match the entries for the various lifecycle stages, the expert system may identify a relevant contact in a vendor company based on the conflict identified.

Figure 5:
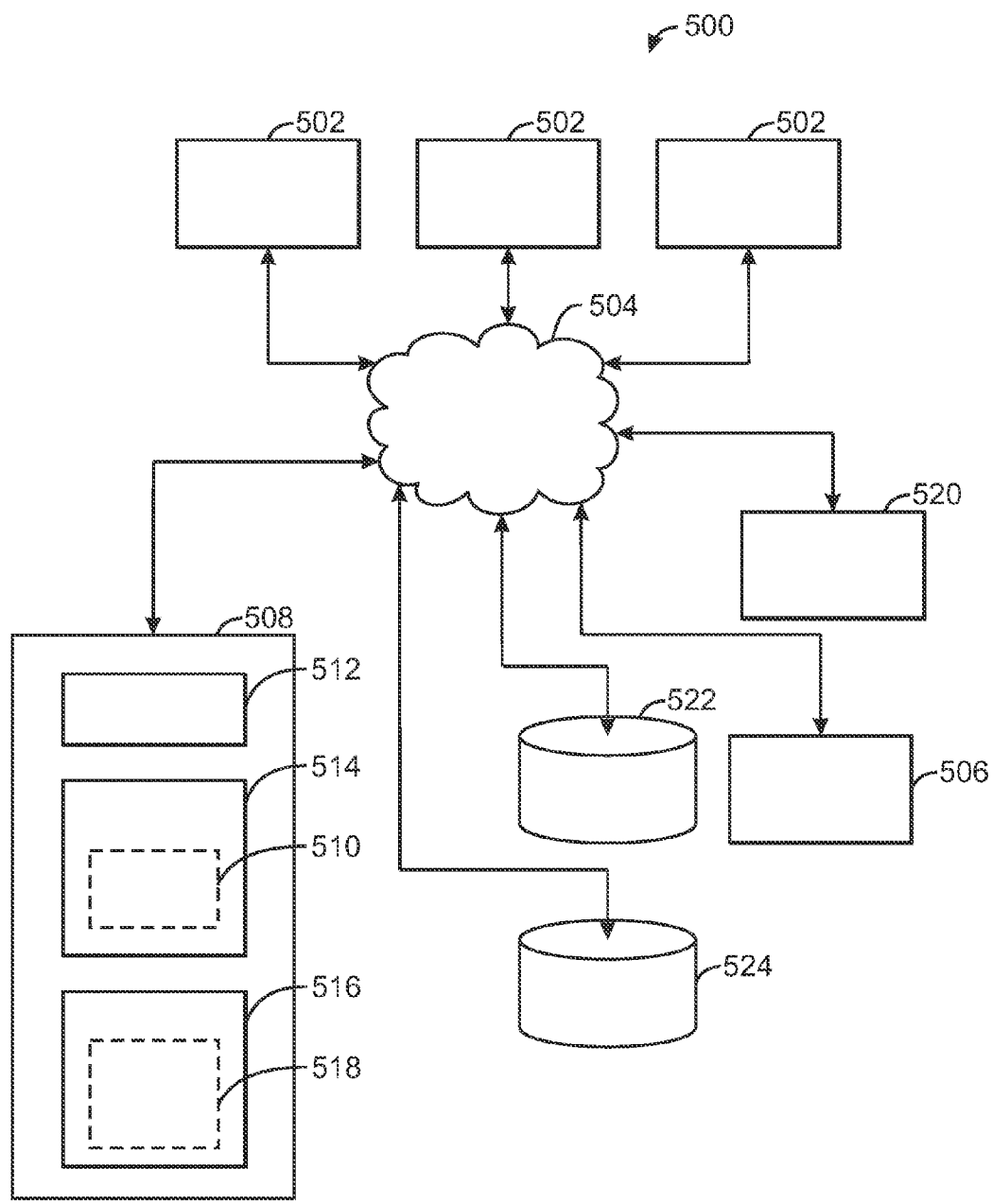
FIG. 5 is a block diagram of a system that may be used to implement the expert system, in accordance with an exemplary embodiment of the present techniques.

FIG. 5 is a block diagram of a system 500 that may be used to implement the expert system, in accordance with an exemplary embodiment of the present techniques. In the system 500, a number of client systems 502 may be used by developers to locate product packaging over the Internet 504. However, the access is not limited to the Internet 504, as any networking technology may be used in embodiments, including local area networks (LANs), wide area networks (WANs), and the like. For example, the client systems 502 may be used to access a first supplier 506 to determine if the first supplier 506 can provide appropriate packaging materials for the product.

The first supplier 506 may display a screen that includes information from an expert system 508 that runs an expert system module 510. The expert system 508 may include a processor 512 and non-transitory computer-readable storage media, such as a memory 514 and a storage system 516. The processor 512 may be a single processor or a cluster computing system. The memory 514 may include random access memory (RAM) and read-only memory (ROM). The storage system 516 may include random access the hard drives, optical drive, RAM disks, or any number of other storage units.

The expert system module 510 may include hardware and software elements, for example, comprising code stored in memory 512 and executed by the processor 512. The code may also be stored in the storage system 516, either for long-term storage or in subunits that may be accessed as needed.

The storage system 516 may hold a database 518 of products and suppliers. The database 518 may hold information needed for determining appropriate packaging choices from the lifecycle parameters entered. For example, the database 518 may contain product listings and visuals obtained from the first supplier 506, a second supplier 520, or any number of other suppliers.

The database 518 does not need to contain all of the information needed to make packaging selections based on the lifecycle parameters. In embodiments, the expert system module 510 may access external databases to obtain supplemental information. For example, the expert system module 510 may access a regulatory database 522 to obtain information concerning regulations on packaging materials and labels. Such information may include restrictions on packing certain products in certain plastics, or information requirements for labeling pharmaceuticals. Further, the expert system module 510 may access a materials database 524, for example, to identify incompatibilities between products and packaging materials.

As discussed above, in an exemplary embodiment, a version of the expert system module 510 may be directly accessed on the server 508 from a client system 502. In this embodiment, products from multiple suppliers, such as the first supplier 506 and a second supplier 520, may be displayed.

The expert system module 510 does not have to be run on a separate server system, such as expert system 508, but may be run on a client system 502. In this exemplary embodiment, the client system 502 would have the same units and functionality as the server 508 and would run the expert system module 510 locally. The expert system module 510 may include a number of sub-units to provide functionality, as discussed with respect to FIG. 6.

Figure 6:
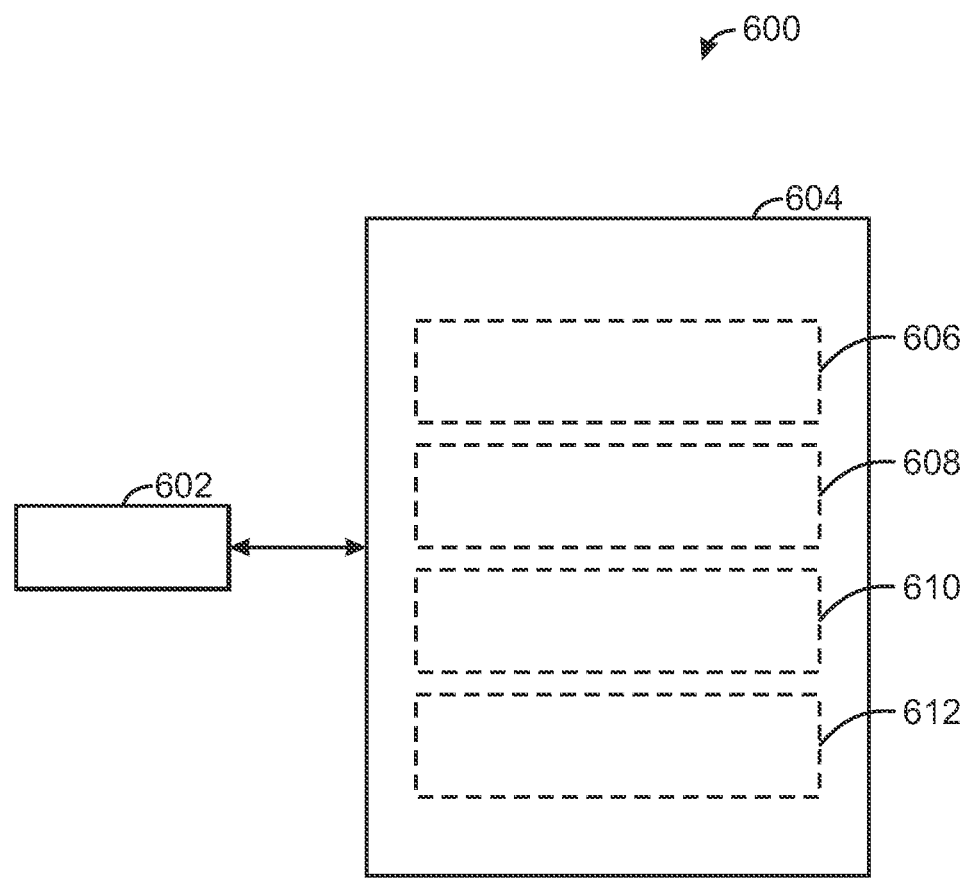
FIG. 6 is a block diagram of a non-transitory, computer-readable medium that stores code for an expert system in accordance with an exemplary embodiment of the present invention.

FIG. 6 is a block diagram of a non-transitory, computer-readable medium that stores code for an expert system in accordance with an exemplary embodiment of the present invention. As shown in FIG. 6, a processor 602 may access an expert system stored in a non-transitory, computer-readable medium 604, such as a memory or storage system. The expert system can have a frame communicator 606 to provide selection frames to supplier Web sites or to generate selection frames for access by a local program. The expert system may have a product entry system 608 to allow entry of the product vertical, ingredients, container size, and the like. The product entry system 608 may make an initial selection of materials and containers for the product packaging. A lifecycle-parameter entry block 610 may obtain the parameters for the various stages from the developer, for example, through the frame communicator 606. The lifecycle-parameter entry block 610 may access various databases or other data sources to eliminate products, recommend content, and the like, as discussed with respect to FIG. 3. A review and selection block 612 may allow a developer to review the parameters selected, and choose a package that meets the criteria, if available. If no package meets all of the criteria, the review and selection block 612 may suggest modifications to the parameters that could allow a package selection to be made. The expert system is not limited to the code blocks shown in FIG. 6, but may use any arrangement or configuration of code to achieve the same functionality.

As described herein, the expert system allows for the selection of appropriate packaging for products, without requiring expertise on the part of a packaging developer. Although many of the packaging solutions discussed above refer to bottles and bottle labels, the methods and systems described herein may be used to select packaging for any number of different products, including beverages, fresh cut vegetables, frozen goods, cosmetics, pharmaceuticals, dry goods, condiments, dairy products, and many others.

What is claimed is:

1. A method comprising:
   receiving, by an expert system running on a computing device, input from a user corresponding to a product type of a product that the user is to package;
   determining, by the expert system, a plurality of lifecycle stages relevant to the product type and that the product undergoes through a lifetime of the product;
   permitting, by the expert system, the user to denote that one of the more of the lifecycle stages that the expert system has determined as relevant to the product type are irrelevant;
   permitting, by the expert system, the user to select a chosen lifecycle stage from the lifecycle stages, as one of a bottling process, a labeling process, a shipping process, and a disposing process;
   determining, by the expert system, a plurality of lifecycle parameters relevant to the chosen lifecycle stage for the product type;
   receiving, by the expert system, values from the user for the lifecycle parameters relevant to the chosen lifecycle stage;
   determining, by the expert system, a plurality of packaging component recommendations for the product at the chosen lifecycle stage from the values from the user for the lifecycle parameters relevant to the chosen lifecycle stage,
   wherein other values for other lifecycle parameters relevant to other lifecycle stages that the user has provided affect how the expert system determines the packaging component recommendations for the product at the chosen lifecycle stage.

2. The method of claim 1, wherein the packaging component recommendations are further determined based on regulatory requirements.

3. The method of claim 2, wherein the regulatory requirements comprise one or more of: a packaging material and label information.

4. A non-transitory computer-readable medium comprising expert system computer program code that when executed by a processor causes the processor to:
   receive input from a user corresponding to a product type of a product that the user is to package;
   determine a plurality of lifecycle stages relevant to the product type and that the product undergoes through a lifetime of the product;
   permit the user to denote that one of the more of the lifecycle stages that the expert system has determined as relevant to the product type are irrelevant;
   permit the user to select a chosen lifecycle stage from the lifecycle stages, as one of a bottling process, a labeling process, a shipping process, and a disposing process;
   determine a plurality of lifecycle parameters relevant to the chosen lifecycle stage for the product type;
   receive values from the user for the lifecycle parameters relevant to the chosen lifecycle stage;
   determine a plurality of packaging component recommendations for the product at the chosen lifecycle stage from the values from the user for the lifecycle parameters relevant to the chosen lifecycle stage,
   wherein other values for other lifecycle parameters relevant to other lifecycle stages that the user has provided affect how the expert system computer program code determines the packaging component recommendations for the product at the chosen lifecycle stage.

5. The non-transitory computer-readable medium of claim 4, wherein the packaging component recommendations are further determined based on regulatory requirements.

6. The non-transitory computer-readable medium of claim 5, wherein the regulatory requirements comprise one or more of: a packaging material and label information.

7. An expert system comprising:
   a processor; and
   a memory storing expert system computer program code to direct the processor to:
   receive input from a user corresponding to a product type of a product that the user is to package;
   determine a plurality of lifecycle stages relevant to the product type and that the product undergoes through a lifetime of the product;
   permit the user to denote that one of the more of the lifecycle stages that the expert system has determined as relevant to the product type are irrelevant;
   permit the user to select a chosen lifecycle stage from the lifecycle stages, as one of a bottling process, a labeling process, a shipping process, and a disposing process;
   determine a plurality of lifecycle parameters relevant to the chosen lifecycle stage for the product type;
   receive values from the user for the lifecycle parameters relevant to the chosen lifecycle stage;
   determine a plurality of packaging component recommendations for the product at the chosen lifecycle stage from the values from the user for the lifecycle parameters relevant to the chosen lifecycle stage,
   wherein other values for other lifecycle parameters relevant to other lifecycle stages that the user has provided affect how the expert system computer program code determines the packaging component recommendations for the product at the chosen lifecycle stage.

8. The expert system of claim 7, wherein the packaging component recommendations are further determined based on regulatory requirements.

9. The expert system of claim 8, wherein the regulatory requirements comprise one or more of: a packaging material and label information.

* * * * *